United States Patent [19]

Schüler et al.

[11] Patent Number: 4,567,220

[45] Date of Patent: Jan. 28, 1986

[54] PRODUCTION OF COPPER(II) HYDROXIDE PHOSPHATE WITH A LIGHT NATURAL COLOR AND AN AVERAGE GRAIN SIZE LESS THAN 10 MICRONS

[75] Inventors: Ralf Schüler, Recklinghausen; Günther Maahs, Marl, both of Fed. Rep. of Germany

[73] Assignee: Chemische Werke Hüls Aktiengesellschaft, Marl, Fed. Rep. of Germany

[21] Appl. No.: 664,838

[22] Filed: Oct. 25, 1984

[30] Foreign Application Priority Data

Nov. 23, 1983 [DE] Fed. Rep. of Germany ....... 3342292

[51] Int. Cl.$^4$ .................................................. C08K 3/10
[52] U.S. Cl. ..................................... 524/413; 524/417; 524/567; 528/490; 423/305; 423/307; 423/309; 423/604; 424/140
[58] Field of Search ......................... 524/417, 567, 413; 528/490; 423/305, 307, 309, 604; 424/140

[56] References Cited

U.S. PATENT DOCUMENTS

Re. 28,472  7/1975  Aronberg .............................. 148/25
4,294,808 10/1981  Wasel-Nielen et al. ............. 423/307
4,346,065  8/1982  Maurer et al. ....................... 423/307
4,390,654  6/1983  Schuler et al. ...................... 524/413
4,482,541 11/1984  Telfer et al. ......................... 424/140

FOREIGN PATENT DOCUMENTS 3145997  6/1983  Fed. Rep. of Germany ...... 424/140

*Primary Examiner*—Paul R. Michl
*Assistant Examiner*—N. Sarofin
*Attorney, Agent, or Firm*—Wells & Wells

[57]  ABSTRACT

A process for producing a copper(II) hydroxide phosphate having the $Cu_3(PO_4)_2 \cdot Cu(OH)_2$ composition and having a light natural color and an average grain size less than 10 microns. Basic copper carbonate of a bulk density less than 800 grams per liter is treated in an aqueous dispersion with phosphoric acid at temperatures less than 70° C. and the reaction mixture is then mechanically agitated further within the same temperature range.

The copper phosphate so obtained is applicable as a smoke-reducing additive in polyvinyl or molding materials containing the same.

8 Claims, No Drawings

PRODUCTION OF COPPER(II) HYDROXIDE PHOSPHATE WITH A LIGHT NATURAL COLOR AND AN AVERAGE GRAIN SIZE LESS THAN 10 MICRONS

CROSS REFERENCE TO A RELATED APPLICATION

Applicants claim priority under 35 USC 119 for application No. P 33 42 292.3, filed Nov. 23, 1983, in West Germany.

BACKGROUND OF THE INVENTION

The field of the invention is inorganic chemistry and the present invention is particularly concerned with the preparation of basic copper phosphate.

The principles of preparing basic copper phosphate are known, as disclosed in GMELIN, Handbuch der anorg. Chemie, Vol. 60, Part A, p 175, and part B, pp 920-5, and H. Guerin & H. Kozicki, "Copper Orthophosphates", Chem. Abstracts, 47, 12086 (1953).

Recently copper(II) hydroxide phosphate of the composition $Cu_3(PO_4)_2 \cdot Cu(OH)_2$ has become significant as a smoke-reducing additive for thermoplastics, in particular polyvinylchloride, as disclosed in U.S. Pat. No. 4,390,654, the disclosure of which is incorporated herein by reference.

The prior art methods for producing copper(II) hydroxide phosphate result, however, in products with a high grain size essentially exceeding ten microns and evincing a dark natural color.

Such properties, however, significantly reduce their application in colorless thermoplastics due to the definite coloration from the natural dark color and due to the inherently uneven distribution of the coarse powders.

SUMMARY OF THE INVENTION

Having in mind the limitations of the prior art, it is an object of the present invention to provide an improved process for making copper(II) hydroxide phosphate having the composition $Cu_3(PO_4)_2 \cdot Cu(OH)_2$ and having a light natural color and an average grain size less than ten microns.

This object has been achieved by using basic copper carbonate having a bulk density of 100 to 800 grams per liter and treating the carbonate in an aqueous dispersion with at least stoichiometric quantities of phosphoric acid at temperatures less than 70° C. The reaction mixture is mechanically stirred within the same temperature range, briefly heated to the boiling point of the aqueous phase, and then copper (II) hydroxide phosphate is separated from the aqueous phase.

DESCRIPTION OF THE PREFERRED EMBODIMENTS

The basic copper carbonate used in particular is the $CuCO_3 \cdot Cu(OH)_2$ malachite type with a bulk density less than 800 grams per liter. Advantageously, the bulk density is between 100 and 600 and, preferably, between 300 and 600 grams per liter. Where available, one may also use a basic copper carbonate with the composition $2\,CuCO_3 \cdot Cu(OH)_2$ [azurite]. The bulk density is determined according to DIN (German Industrial Standard) 53,468. According to DIN 53,468, basic copper carbonate is allowed to flow from a funnel into a measuring cup of a specific volume, and thereupon the weight of carbonate in the measuring cup is measured with the surface wiped flat. The bulk densities of commercial basic copper carbonates range as high as 1,500 grams per liter. In the process of the present invention, those copper carbonate fractions with bulk densities within the required range of 100 to 800 grams per liter are selected.

The basic copper carbonate is processed in an aqueous dispersion with phosphoric acid which is added appropriately to the dispersion in gradual manner and in small amounts, for instance by being dripped into it. The basic copper carbonate in the aqueous dispersion has a concentration of 5 to 25% by weight. The phosphoric acid is used at least in stoichiometric quantities, and advantageously an excess of 5% by mass phosphoric acid is used. The phosphoric acid can be used in arbitrary concentrations and appropriately an acid of substantial concentration is employed in order to be able to operate with reduced volumes. In particular, the commonplace 85% phosphoric acid suggests itself because it is commercially available.

The phosphoric acid is added to the dispersion at a temperature less than 70° C., advantageously at a temperature of about 60° C. The reaction can also be carried out at temperatures down to 0° C., however, in such a case the mechanical post-treatment is relatively long, whereby the lower temperature preferably shall be 20° and, in particular, 40° C.

When the phosphoric acid is added, first the blue, water-soluble copper phosphate precipitates, which next passes into a light-green, almost colorless copper(II) hydroxide phosphate in the course of the mechanical motion of stirring. The same temperature range as for the precipitation with phosphoric acid is used during the mechanical post-treatment of the dispersion, i.e., during the post-agitation. The agitation stage lasts suitably 15 to 60 minutes and the post operation stage 0.5 to 8 hours.

The temperature should be kept at 70° C. or less both when precipitating and during post-agitation because otherwise dark and coarse, crystalline copper phosphates result. Temperatures lower than 40° C. entail long post-agitation times. (more than 8 hours). However, it is possible to carry out the precipitation at relatively high temperatures below 70° C. and to complete the post-agitation without supplying further heat provided that the minimum temperature is not below 40° C. Therefore, the advantageous temperature range for both the precipitation and post-agitation steps is 40° to 70° C.

A pH value of about 8 is present in the aqueous phase before the precipitation begins and drops to about 4 after the phosphoric acid has been added, rising again to 5 to 6 during the intermediate phase of post-agitation and, lastly, settling at a constant value of about 4 in the final state.

After the post-agitation, the reaction mixture is briefly heated to the boiling point of the aqueous phase in order to remove the residual carbon dioxide. A temperature of 90° to 100° C. is usually adequate and lasts 15 to 60 minutes.

Finally, the copper(II) hydroxide phosphate is separated from the aqueous phase for instance by filtration or evacuation. Then, copper(II) hydroxide phosphate is dried under atmospheric or reduced pressure at 100° to 120° C.

EXAMPLE 1

50 g (0.4 mole) of an 85% phosphoric acid are dripped during a period of fifteen minutes at 60° C. into an aqueous suspension of 83 g (0.38 mole) of a basic copper carbonate (bulk density ~500 grams per liter) in 500 ml of water. Prior to the addition of the phosphoric acid, the pH value of the aqueous phase is about 8, then it drops to 4 following the addition. Post-agitation takes place for 40 minutes at 55° C., the pH then rising again above 5 but then assuming a constant value of 4.

During this time, the initially light-blue product gradually changes colors to become light-green to nearly white. Then this product is heated for 30 minutes to the boiling point and, thereafter, it was evacuated and dried at reduced pressure at 100° C. The yield is 84 grams (94% of theory).

Analytical Values:
Cu=52.9% (theory=53.1%)
P=12.9% (theory=13.0%)
H=0.36% (theory=0.42%).

Bulk density: 320 grams per liter.

Bar-shaped crystals of $Cu_3(PO_4)_2 \cdot Cu(OH)_2$ with a length of about 3 microns and a thickness of about 0.3 micron are seen in the electron-microscope scan picture.

EXAMPLE 2

Example 1 of U.S. Pat. No. 4,390,654 and corresponding West German Published Application No. 3,116,969 is repeated with the copper(II) hydroxide phosphate of the present invention as follows:

A vinyl chloride polymer mixture was prepared as follows:

100 parts by weight of granulated PVC of a standard type having the following composition:
80 parts M-PVC (bulk-PVC)
20 parts E-PVC (emulsion-PVC)
2.5 parts lead phosphite
1.5 parts lead stearate
0.5 part calcium stearate
1.8 parts stearic acid and stearic acid derivatives
12 parts chalk
6 parts pigment ($TiO_2$+carbon black), was intimately kneaded on a roll at a temperature of 180° C. with various differing amounts of copper(II) hydroxide phosphate of the formula $(Cu_3(PO_4)_2 \cdot Cu(OH)_2$, and thereafter pressmolded into panels having a thickness of 1 mm. These panels were cut to a size of 75×75 mm² and disintegrated in the NBS smoke chamber under standard conditions, with and without an ignition flame. The smoke evolved, measured by means of the reduction in the intensity of a light beam passing therethrough, and the signals from a light sensor recorded by means of a recorder and the maximum smoke density was determined therefrom. The following Table I lists the results of these measurements as well as the results of the determination of the LOI Value for indicating flammability. In the Table, all values are percent by weight values.

TABLE I

| Parts of Copper(II) Hydroxide Phosphate | LOI | Smoke Density | | | |
|---|---|---|---|---|---|
| | | Smoldering | | Flaming | |
| | | $D_m/g$ (g$^{-1}$) | Smoke Reduction | $D_m/g$ (g$^{-1}$) | Smoke Reduction |
| 0 | 44 | 21 | — | 37 | — |
| 0.5 | 43 | 20 | 5% | 27 | 27% |
| 1 | 44 | 19 | 10% | 25 | 32% |
| 2.5 | 48 | 17 | 19% | 21 | 43% |
| 5 | 54 | 14 | 33% | 16 | 57% |
| 10 | 60 | 9 | 57% | 13 | 65% |

CONTROL TEST 1

Example 1 is repeated except that a basic carbonate with a bulk density of about 1,100 grams/liter is used. The pH function is similar to that in Example 1, but the limit value is reached only after several hours, and the change of the blue intermediate product into the end product takes place with similar slowness. The end product is substantially darker, the mean grain size is about 20 microns, and the chemical composition of the product corresponds to that of the product of Example 1.

CONTROL TEST 2

Example 1 is repeated except that the temperature is 100° C. during the addition of the phosphoric acid and during post-agitation. The pH function is similar to that of Example 1, however the limit value is reached within 15 minutes; the blue intermediate stage is not observed, the end product being dark green. The electron microscope scan shows crystals in the shape of bars about 30 microns long and 5 microns thick. The chemical composition of the product corresponds to that of the product of Example 1.

What we claim is:

1. In the process for producing copper(II) hydroxide phosphate from basic copper carbonate by treatment with phosphoric acid, the improvement comprising:
    (a) selecting said basic copper carbonate having a bulk density less than 800 grams per liter;
    (b) treating said selected basic copper carbonate in aqueous dispersion with at least stoichiometric quantities of said phosphoric acid to form a mixture at temperatures not exceeding 70° C.;
    (c) mechanically agitating said mixture at said temperature not exceeding 70° C.;
    (d) heating said agitated mixture to the boiling point thereof; and
    (e) separating said copper(II) hydroxide phosphate having the formula $Cu_3(PO_4)_2 \cdot Cu(OH)_2$ and a light, natural color with a mean grain size less than 10 microns from said boiled mixture.

2. The process of claim 1, wherein said basic copper carbonate has a bulk density of 100 to 800 grams per liter.

3. The process of claim 1, wherein said basic copper carbonate has a bulk density of 300 to 600 grams per liter.

4. The process of claim 2, wherein the temperature of steps (b) and (c) is 0° C. to 70° C.

5. The process of claim 3, wherein the temperature of steps (b) and (c) is 40° C. to 70° C.

6. The process of claim 3, wherein the temperature of steps (b) and (c) is about 60° C.

7. The product obtained by the process of claim 1.

8. A polyvinyl chloride blend comprising a vinyl chloride polymer and an amount of copper(II) hydroxide phosphate of the formula $Cu_3(PO_4)_2 \cdot Cu(OH)_2$ effective as a smoke retardant, wherein said copper(II) hydroxide phosphate is prepared by the process of claim 1.

* * * * *